May 24, 1938.　　　　B. S. AIKMAN　　　　2,118,389
SLACK ADJUSTER
Filed Nov. 19, 1935　　　　2 Sheets-Sheet 1
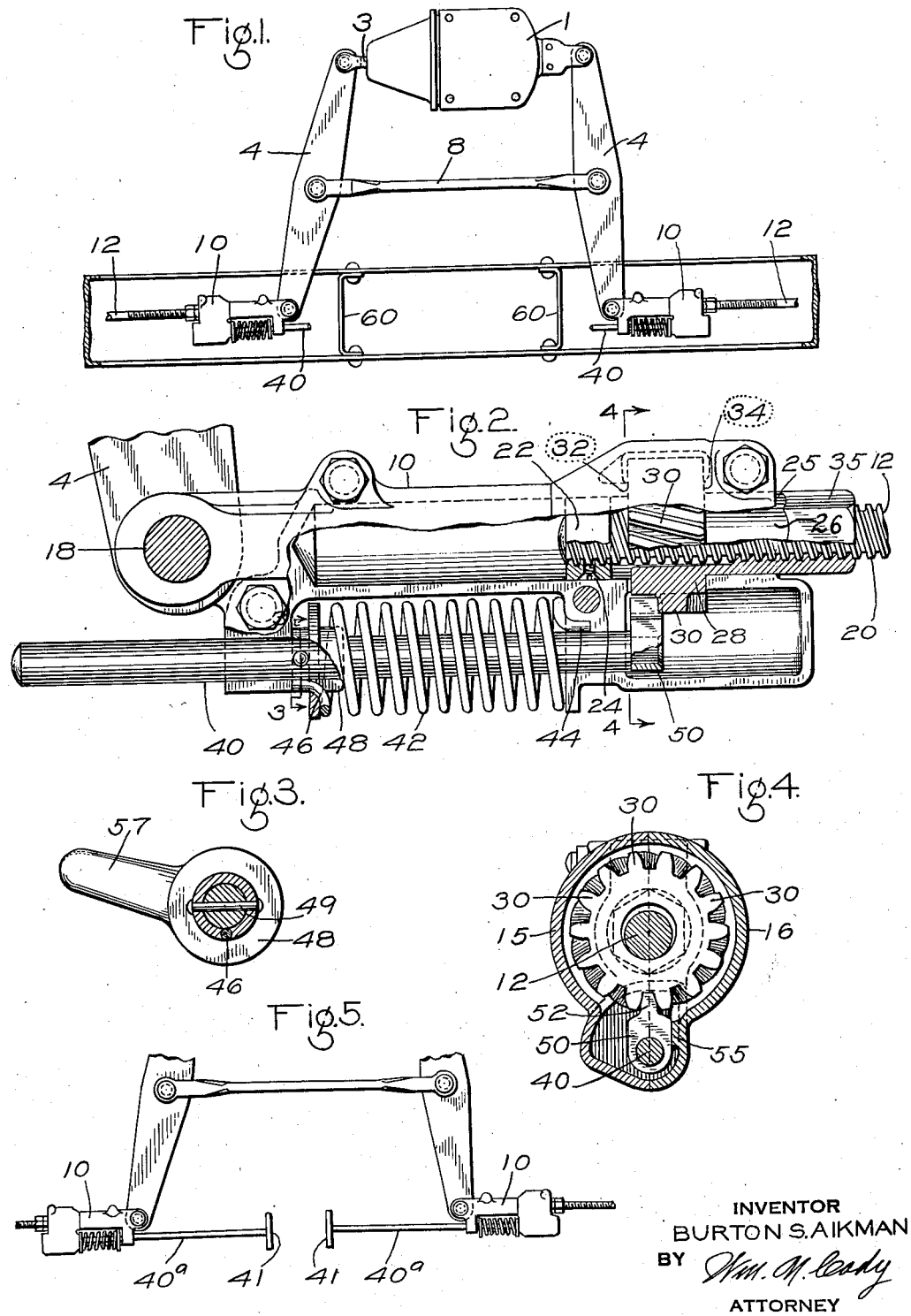
INVENTOR
BURTON S. AIKMAN
BY
ATTORNEY May 24, 1938.  B. S. AIKMAN  2,118,389
SLACK ADJUSTER
Filed Nov. 19, 1935  2 Sheets-Sheet 2
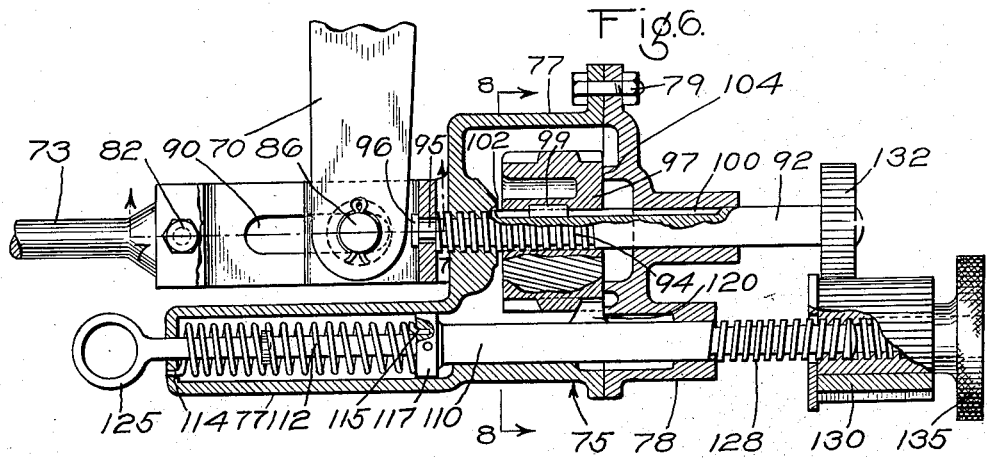
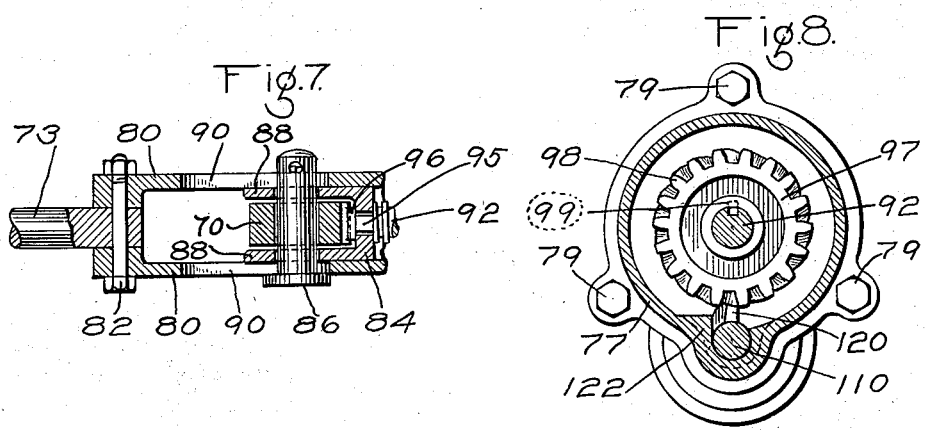
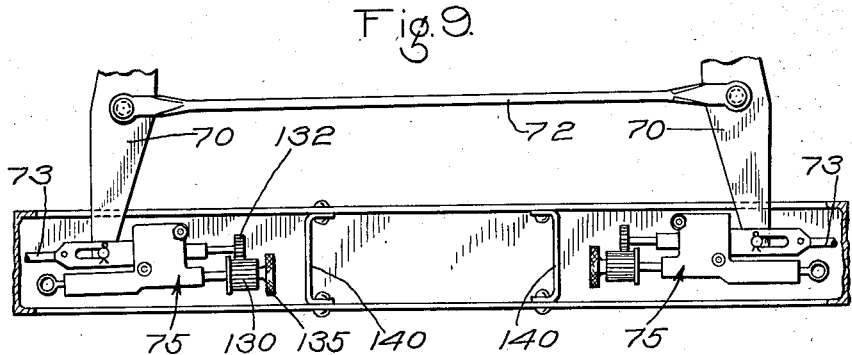
INVENTOR
BURTON S. AIKMAN
BY
ATTORNEY Patented May 24, 1938

2,118,389

UNITED STATES PATENT OFFICE 2,118,389

SLACK ADJUSTER

Burton S. Aikman, Wilkinsburg, Pa., assignor to The Westinghouse Air Brake Company, Wilmerding, Pa., a corporation of Pennsylvania Application November 19, 1935, Serial No. 50,518

18 Claims. (Cl. 188—202)

This invention relates to fluid pressure brakes and more particularly to an automatic slack adjuster for automatically taking up the slack in the brake rigging due to wear of the brake shoes and the associated parts, so that the brake cylinder piston travel may be maintained substantially constant.

An object of this invention is to provide an automatic slack adjuster which will operate to take up the slack in the brake rigging due to wear of the brake shoes and of the associated brake parts, and which will operate to maintain substantially the same angular relationship between the brake cylinder piston and the brake lever, and also between the brake lever and the brake pull rod, throughout the entire range of adjustment provided by the device.

Another object of the invention is to provide an automatic slack adjuster which incorporates means to limit travel of the brake cylinder piston and thereby prevent damage to the brake cylinder as a result of excess piston travel.

A further object of the invention is to provide an automatic slack adjuster incorporating means normally operative to lock the device against adjustment in a direction to release the brakes, and having manually operable means by which the locking means may be released, together with manually operable means to adjust the device to release the brakes, whereby the device may be readily conditioned to permit renewal of the brake shoes.

Another object of the invention is to provide an improved automatic slack adjuster which is simple and rugged in construction and positive in operation.

Other objects of the invention and features of novelty will be apparent from the following description taken in connection with the accompanying drawings, in which Fig. 1 is a fragmentary diagrammatic view of a brake equipment incorporating the automatic slack adjusting means provided by my invention, Fig. 2 is a view, partly in section, of one of the automatic slack adjusting devices employed in the brake equipment shown in Fig. 1, Fig. 3 is a sectional view taken substantially along the line 3—3 of Fig. 2, Fig. 4 is a sectional view taken substantially along the line 4—4 of Fig. 2, Fig. 5 is a fragmentary diagrammatic view of another form of the brake equipment embodying this invention, Fig. 6 is a view, largely in section, of a modified form of automatic slack adjusting device embodying my invention, Fig. 7 is a sectional view taken substantially along the line 7—7 of Fig. 6, Fig. 8 is a sectional view taken substantially along the line 8—8 of Fig. 6, and Fig. 9 is a fragmentary diagrammatic view of a brake equipment employing devices of the type shown in Fig. 6.

Referring to Fig. 1 of the drawings the brake cylinder of the equipment therein disclosed is indicated at 1 and is secured to a portion of the car structure. The brake cylinder piston rod 3 is pivotally secured to one end of a brake lever 4, while the brake cylinder has secured thereto one end of a similar brake lever 4. The brake levers 4 are connected together by means of a tie rod 8.

The free end of each of the levers 4 has pivotally secured thereto an automatic slack adjusting device indicated generally by the reference numeral 10, and each of these devices has connected thereto a brake pull rod 12.

The construction of the automatic slack adjusting device 10 is best shown in Figs. 2 to 4 of the drawings. These devices are similar in construction, and, as shown, each comprises a housing or casing which is constructed of the casing sections 15 and 16, which are secured together by suitable bolts, and is pivotally secured to the free end of one of the brake levers 4 by means of a pin 18.

The casing sections 15 and 16 cooperate to form a bore into which extends the end of a pull rod 12, which is provided with suitable threads, indicated at 20, and which has secured on the end thereof a bushing 22, which is held in position by means of a set screw 24. The bushing 22 is proportioned so as to closely fit the bore formed by the casing sections 15 and 16 and to guide the end of the pull rod 12.

A rotatable adjusting member, indicated generally by the reference numeral 25, is provided, and has a bore extending therethrough which is provided with threads complementary to the threads on the pull rod. The adjusting member 25 includes a hub portion 26, which is rotatably supported in the bore formed by the casing sections 15 and 16, and a flange portion indicated at 28, which has formed in the periphery thereof helical gear teeth 30, which extend at an angle to the axis about which the rotatable member 25 rotates. The flange portion 28 rotates between bearing surfaces 32 and 34 formed on the casing sections 15 and 16 which serve to limit axial movement of the member 25, while the end of the hub portion 26 projects outside of the bore in the casing and has a plurality of flat faces 35 thereon which are adapted to be engaged by a wrench.

The slack adjusting device 10 also includes an operating element in the form of a shaft 40, which is rotatably and slidably supported in aligned bores formed by the casing sections 15 and 16 and this element is urged to the left, as viewed in Fig. 2 of the drawings, by means of a combined torsion and compression spring 42, which has one end 44 thereof extending into a recess between the casing sections 15 and 16, and which has the other end 46 extending through an opening in a spring seat member 48 which is rigidly secured to the shaft 40 by means of a pin 49.

One end of the operating element 40 extends into a chamber formed between the casing sections 15 and 16 and has secured thereon a lug 50 which has a tooth 52 formed thereon, which, in one position of the operating element 40, is adapted to extend between the teeth 30 on the rotatable member 25. The operating element 40 is rotatably urged by the spring 42 to a position to maintain the lug 50 in engagement with a stop 55 formed on the casing section 16, as is best shown in Fig. 4 of the drawings.

The spring seat 48 has a handle 57 formed integral therewith and projecting therefrom, as is best shown in Fig. 3 of the drawings, while the free end of the operating element 40 projects beyond the adjacent portions of the brake lever 4, as is best shown in Figs. 1 and 2 of the drawings.

In the operation of the brake equipment shown in Fig. 1 of the drawings, on the supply of fluid under pressure to the brake cylinder 1, the piston rod 3 thereof moves outwardly and its movement is transmitted through the associated brake levers 4 and the tie rod 8, so as to cause the pull rods 12 to be moved towards each other, thereby applying the brakes.

After a certain amount of travel of the brake cylinder piston, the free end of the operating element 40 will engage a portion of the car structure indicated at 60, so that on further movement of the piston, the operating element 40 will remain stationary and the body of the automatic slack adjusting device 10 will be moved against the spring 42, and will move the rotatable member 25 relative to the tooth 52 on the member 50.

The amount of travel permitted the brake cylinder piston before the slack is taken up in the brake rigging and the brake shoes pressed against the wheels depends upon the condition of the brake shoes and of the brake rigging, and if these are in such condition as to permit the brake cylinder piston to travel more than a predetermined distance, the body of the slack adjusting device 10 will be moved against the spring 42 relative to the operating element 40 a distance greater than the axial width of the teeth 30 on the rotatable member 25.

At this time the pull rod 12 is under tension so that the rotatable member 25 is prevented from turning by the friction between the flange portion 28 and the bearing surface 34, and by the friction between the threads on the pull rod 12 and in the bore in the member 25. As the teeth 30 on the rotatable member 25 move across the tooth 52, the tooth 52 is engaged by a tooth 30 and causes the lug 50 to rotate in a counterclockwise direction, as viewed in Fig. 4 of the drawings, thereby increasing the torsional bias on the spring 42, while at the same time the degree of axial compression on the spring 42 is increased due to axial movement of the body of the device 12 relative to the spring seat 48. During this movement of the rotatable member 25 the lug 50 is moved away from the stop 55 on the casing section 16.

When the rotatable member has been moved the full axial width of the teeth 30 on the rotatable member 25, so that the tooth 52 no longer extends between the teeth 30, the operating element 40 and the lug 50 are rotated by means of the spring 42 so as to again bring the lug 50 into engagement with the stop 55 on the casing section 16. The lug 52 is now substantially in alignment with the space between the teeth on the rotatable member 25, adjacent to the space into which it previously extended.

Upon the release of fluid under pressure from the brake cylinder 1, the brake cylinder piston is returned by means of a return spring, not shown, to the position in which it is shown in the drawings, and, on this movement of the piston, the brake levers 4 are operated so as to move the ends of the levers away from the portion 60 of the car structure, thereby moving the slack adjusting devices 10 away from these portions of the car structure.

When a slack adjusting device 10 is moved away from the portion 60 of the car structure, the operating element 40 is maintained in engagement with the car structure by the spring 42 which expands axially and moves the lug 50 across the face of the rotatable member 25, so as to return the operating element to the normal position as shown in Fig. 2 of the drawings. During this movement of the operating element 40 the lug 50 is maintained against rotation in a clockwise direction, as viewed in Fig. 4 of the drawings, by the stop 55, with the result that the tooth 52 will engage one of the teeth 30 on the rotatable member 25 and cause this member to rotate in a clockwise direction as viewed in Fig. 4 of the drawings, thereby turning the member 25 farther upon the threads 20 on the pull rod 12, and causing the end of the pull rod 12 to be moved farther into the bore formed in the casing sections 15 and 16, thus shortening the effective length of the pull rod 12, and reducing the amount of slack in the brake rigging.

On the next application of the brakes the amount of travel of the brake cylinder piston will be diminished because of the reduced amount of slack in the brake rigging so that the operating element 40 will either not engage the portion 60 of the car structure, or the amount of movement of the piston after the operating element 40 is in engagement with the portion 60 of the car structure will be insufficient to move the rotatable member 25 an amount equal to the axial width of the teeth 30 on the rotatable member 25.

The member 25 will be moved only a part of the distance across the face of the teeth 30 during this application of the brakes, and on the subsequent release of the brakes, the operating element 40 will be returned to the normal position axially and rotatably by the spring 42.

However, as the amount of slack in the brake rigging increases due to wear of the brake shoes, or for other reasons, the amount of travel of the brake cylinder piston will increase and will eventually increase to an amount sufficient to cause the rotatable member 25 to again be moved the entire axial width of the teeth 30, whereupon the device will again operate as described in detail above to reduce the effective length of the pull rod 12, thus reducing the amount of slack in the brake rigging, and thereby maintaining the amount of travel of the brake cylinder piston substantially uniform at all times.

During an application of the brakes the device provided by this invention is prevented from operating to increase the effective length of the pull rod 12 by the friction between the rotatable member 25 and the bearing surface 34, which will be relatively high due to the tension on the pull rod 12. When the brakes are released the member 25 is prevented from turning in a direction to increase the effective length of the pull rod 12 by the lug 50, which is prevented from rotating by the stop 55, and which has the tooth 52, which extends between the teeth 30 to prevent rotation of the rotatable member 25.

The device provided by this invention provides means, however, by which the effective length of the pull rod 12 may be increased when it is desired to do so, either for replacing the brake shoes or for other reasons. When it is desired to increase the effective length of the pull rod 12 the operating member 40 may be manually moved from the normal position, in which it is shown in Fig. 2 of the drawings, to a release position. The operating element 40 may be moved against the spring 42 to the release position very readily by an operator who may grasp the handle 57 associated with the spring seat 48, and thus move the operating element 40 to the right until the lug 50 is out of alignment with the teeth 30 on the rotatable member 25.

The rotatable member 25 will no longer be held by the lug 50, and the rotatable member may be readily turned by means of a wrench which may engage the flat faces 35 formed on the hub portion 26 of the rotatable member. When the desired adjustment of the pull rod 12 has been secured the operator may release the pressure on the handle 57 and the spring 42 will thereupon return the operating element 40 to the normal position in which movement of the rotatable member in the direction to increase the effective length of the pull rod is prevented by the lug 50.

If required the operating element 40 may be rotated somewhat by means of the handle 57 so as to bring the tooth 52 on the lug 50 into alignment with a space between the teeth 30 on the rotatable member 25 so that the tooth 52 may move to the normal position and not be held by the end of one of the teeth 30.

It will be seen that the slack adjuster provided by this invention operates automatically on an increase in the amount of travel of the brake cylinder piston to an amount in excess of a predetermined distance to reduce the amount of slack in the brake rigging and thus reduce the amount of travel of the brake cylinder piston.

It will be seen also that the slack adjuster provided by this invention is interposed in the brake pull rod so as to reduce the effective length of the pull rod and thereby reduce the amount of slack in the brake rigging, and at the same time maintain the same angular relationship between the brake lever and the pull rod, and between the brake lever and the brake cylinder piston, so that the braking effectiveness produced on the supply of fluid under pressure to the brake cylinder will not be altered by changes in the working angles of the brake levers.

In addition, it will be seen that in the brake equipment provided by this invention, if for any reason, such as the loss of a brake pin or the breakage of a pull rod, one of the brake levers is permitted to travel outside its normal range of travel, its movement will be limited by engagement with a portion of the car structure, and the various parts of the equipment are arranged and proportioned so that movement of the brake lever will be arrested before the brake cylinder piston engages the non-pressure end of the brake cylinder, thus preventing damage to these portions of the equipment, and also preventing complete failure of the brake equipment.

As each of the brake pull rods has means associated therewith to shorten the pull rod and thereby take up the slack in the brake rigging controlled by the pull rod on movement of the brake lever associated with the pull rod beyond a predetermined position relative to the portion 60 of the car structure, the brake lever will be maintained substantially in the same position relative to the portion 60 of the car structure throughout the entire range of adjustment of the slack adjusting device, and the lever will, therefore, engage the portion 60 of the car structure after substantially the same amount of movement from the release position.

It will be seen also that the device provided by this invention incorporates means which normally operates to lock this device against movement in a direction to increase the effective length of the brake pull rod, and that this means may be readily conditioned, when desired, to permit manual adjustment of the device.

In Fig. 5 of the drawings I have illustrated a modified form of brake equipment embodying my invention, and, as illustrated, the automatic slack adjusting devices 10 have operating elements 40a associated therewith, each of which is provided with an enlarged end portion 41, which is adapted to engage a similar enlarged end portion on the operating element associated with the other of the slack adjusting devices on movement of the brake cylinder piston beyond a predetermined distance. These slack adjusting devices operate in substantially the same manner as those employed in the equipment shown in Fig. 1, and serve to maintain the amount of travel of the brake cylinder piston substantially uniform.

This equipment differs from that in Fig. 1 in that no means is provided to limit travel of the brake levers in the event of failure of a portion of the brake rigging, as is provided in the equipment shown in Fig. 1.

In Fig. 6 of the drawings I have illustrated a modified form of automatic slack adjusting means embodying this invention, and in Fig. 9 of the drawings I have illustrated a brake equipment employing the device shown in Fig. 6.

In the equipment shown in Fig. 9 a pair of brake levers 70 are provided and are connected by means of a tie rod 72. One end of each of the brake levers 70 has secured thereto a pull rod 73, the connection between the brake lever and the pull rod being controlled by means of the automatic slack adjusting device which is indicated generally by the reference numeral 75.

As shown in the drawings, each of the automatic slack adjusting devices 75 comprises a casing or housing having casing sections 77 and 78, which may be detachably secured together by means of bolts 79 which extend through the confronting flanges on the casing sections.

The casing section 77 has spaced arms 80 associated therewith, and the end of the pull rod 73 is secured between these arms by means of a bolt 82. The end of the brake lever 70 extends between the arms 80 and is secured to an adjustable member 84 by means of a pin 86 which extends through ears 88 on the member 84. The pin 86 also extends through the elongated openings 90 in the arms 80 formed on the casing section 77, and serves to guide the member 84 throughout its range of movement.

The casing section 77 has formed therein a threaded opening through which extends a shaft or rod 92, which has threads, indicated at 94, formed thereon which are complementary to the threads on the casing section 77. The end of the shaft 92 has a reduced portion 95 which extends through a portion of the adjustable member 84 and the shaft terminates in a head portion 96 which prevents removal of the member 84 from the shaft.

The shaft 92 has mounted thereon a gear 97 which is prevented from turning relative to the shaft 92 by means of a key 99 carried by the gear and extending into a slot or key way 100 cut in the shaft.

The gear 97 is prevented from moving axially of the shaft 92 by means of bearing surfaces 102 and 104 formed on the casing sections 77 and 78, respectively, while the gear 97 is mounted on the shaft 92 so as to permit the shaft 92 to move axially relative to the gear.

This automatic slack adjusting device includes an operating element 110, which is rotatively and slidably supported in aligned bores in the casing sections 77 and 78, and which is urged to the right as viewed in Fig. 6 of the drawings, and is rotatively urged in a counterclockwise direction as viewed in Fig. 8 of the drawings, by means of a combined torsional and compression spring 112, which is mounted in a recess in the casing section 77, and has one end 114 secured in an opening in the casing section 77, and which has its other end 115 secured to a spring seat 117 which is rigidly secured to the operating element 110.

The operating element 110 has a projecting portion 120 associated therewith which is adapted to extend between the teeth 98 on the gear 97, and also to engage a stop 122 formed on the casing section 77 which limits rotation of the operating element 110, while axial movement of the operating element 110 by the spring 112 is limited by engagement of the projecting portion 120 with the casing section 78.

One end of the operating element 110 extends through an opening in the casing section 77 and terminates in a ring 125, while the other end of this element projects from the casing section 78 and has formed thereon threads 128 which are opposite in direction to the threads 94 formed on the shaft 92.

A member 130, having a bore therein in which are formed threads complementary to the threads 128, is fitted on the end of the element 110 and this member has teeth cut in the periphery thereof which are adapted to mesh with teeth formed on the gear 132, which is rigidly secured on the shaft 92. The member 130 has a hand wheel 135 rigidly secured thereto and projecting therefrom on the side thereof remote from the casing section 78.

In the operation of the system shown in Fig. 9 of the drawings, when the brake cylinder is at atmospheric pressure the brake levers 70 are rotated by a release spring associated with the brake cylinder, not shown, so as to relieve the pull rods 73 from tension and effect the release of the brakes.

On the supply of fluid under pressure to the brake cylinder to effect an application of the brakes, the piston of the brake cylinder causes the brake levers 70 to rotate in opposite directions about the pivotal connections with the tie rod 72, so as to move the ends of the pull rods 73, as shown in Fig. 9 towards each other.

After a certain amount of movement of either of the devices 75 towards the other of these devices, the member 135 will engage a portion of the car structure, indicated at 140, so that on further movement of the slack adjusting device 75 the operating element 110 will be maintained stationary, while the body of the device will be moved relative to the operating element 110, thereby increasing the degree of compression of the spring 112 associated with the operating element 110 and moving the gear 97 across the projecting portion 120 associated with the element 110. During this movement of the device relative to the operating element 110 the gear 132 moves across the relatively wide face of the gear 130, the teeth of these gears remaining in mesh.

Because of the helical or angular shape of the teeth 98 on the gear 97, on movement of the gear 97 across the projecting portion 120, the projecting portion 120 will be rotated in a clockwise direction, as viewed in Fig. 8 of the drawings, away from the stop 122, while the gear 97 will be held against rotation because of the friction between the threads on the shaft 92 and those on the casing section 77.

If the range of movement of the brake lever 70 subsequent to engagement of the member 135 with the portion 140 of the car structure is insufficient to move the device 75 an amount equal to or greater than the width of the face of the gear 97, then on the subsequent release of the brakes, and on movement of the device 75 away from the portion 140 of the car structure, the member 135 will be maintained in engagement with the portion 140 of the car structure by the spring 112, and the projecting portion 120 on the element 110 will be guided by the teeth 98 on the gear 97 and will return to its original position, in engagement with the casing section 78, and on further movement of the device 75 the member 135 will be moved away from the portion 140 of the car structure.

If, however, due to wear of the brake shoes or for other reasons, the amount of movement permitted the pull rod 73, subsequent to engagement of the member 135 with the portion 140 of the car structure before its movement is arrested because of engagement of the brake shoes with the wheels and the removal of the slack from the brake rigging, is sufficient to permit the device 75 to be moved a distance greater than the width of the teeth 98 on the gear 97, the gear 97 will be moved out of alignment with the member 120, and as soon as the teeth 98 on the gear 97 are disengaged from the member 120, the operating element 110 will be rotated by the spring 112 in a counterclockwise direction, as viewed in Fig. 8 of the drawings, until the member 120 again engages the stop 122.

On the subsequent release of the brakes the member 135 will be maintained in substantial engagement with the portion 140 of the car structure by the spring 112, so that on movement of the device 75 away from the portion 140 of the car structure the gear 97 will be moved across the member 120, which, because of its rotation by the spring 112, will extend into the space between the gear teeth adjacent to the space into which it previously extended, and will engage one of the teeth 98 and effect rotation of the gear 97 in a counterclockwise direction as viewed in Fig. 8 of the drawings, the operating element 110 being prevented from rotating by engagement of the projecting portion 120 with the stop 122.

Rotation of the gear 97 is transmitted through the key 99 to the shaft 92, causing the thread 94 on the shaft to advance in the thread formed in the casing section 77 and effecting relative movement between the adjustable member 84 and the casing section 77, thus reducing the effective length of the pull rod 73.

Upon rotation of the shaft 92 the gear 132 is rotated, and it effects rotation of the member 130 in the opposite direction, causing this member to advance on the threads 128 on the element 110 an amount substantially equal to the amount of movement effected between the adjustable member 84 and the casing section 77.

It will be seen that upon rotation of the shaft 92 to reduce the effective length of the pull rod 73, the body of the device 75 is moved towards the portion 140 of the car structure, and that at the same time the member 135 is moved towards the body of the device 75 substantially the same distance so that the position of the member 135 relative to the portion 140 of the car structure remains substantially the same throughout the range of adjustment provided by the device. This insures that the member 135 will engage the portion 140 of the car structure after substantially the same amount of movement of the brake lever 70 from release position, regardless of changes or variations in the adjustment of the device.

The gears 130 and 132 maintain substantially the same relationship to each other during changes in the adjustment of the device as the gear 132 is moved to the left relative to the casing section 78, as viewed in Fig. 6 of the drawings, on an adjustment of the device to reduce the length of the pull rod 73, and the gear 130 will be moved to the left a similar distance because of its rotation on the threads 128 on the member 110.

When the brake equipment is in the release position the projecting portion 120 on the element 110 extends between the teeth 98 on the gear 97 and is prevented by the stop 122 from rotating in a direction to permit the gear 97 to rotate, or to be rotated, by the shaft 92 in a direction to increase the length of the pull rod 73, that is, to release the brakes. The device, therefore, operates normally to lock the members thereof against unintended release of the brakes.

This device incorporates means by which the locking means may be released when it is desired to increase the length of the pull rod, as when replacing the brake shoes. In order to release the locking means an operator may apply force to the ring 125 to move it to the left, as viewed in Fig. 6 of the drawings, thereby moving the element 110 against the spring 112 until the projecting portion 120 no longer extends between the teeth 98 on the gear 97. The operator may then vary the adjustment of the device by turning the member 135, which may be knurled to provide a good gripping surface, and rotation of this member is transmitted to the gear 130 and therefrom to the gear 132 which rotates the shaft 92 and the gear 97, thereby moving the adjustable member 84 towards the body of the device.

This causes the body of the device to move relative to the shaft 92 and produces relative movement between the gear 132 and the element 110, but the gear 132 and the gear 130 are maintained in substantially the same relationship to each other as the gear 130 simultaneously moves relative to the element 110.

When the adjustment of the device is completed the operator releases pressure from the ring 125 and the spring 112 thereupon returns to the element 110 to the position in which the projecting portion 120 engages the casing section 78, in which position the projecting portion 120 extends between teeth 98 on the gear 97 to prevent unintended rotation of this gear.

If, due to breakage or failure of a part of the brake rigging, one of the pull rods 73 is permitted a greater range of movement than normal, the member 135 of the slack adjusting device 75 associated with this pull rod will engage the portion 140 of the car structure to limit further movement of the brake lever 70 so as to prevent complete failure of the brakes and to prevent damage to the brake cylinder or piston as a result of too great movement thereof.

While three embodiments of the improved slack adjusting means provided by this invention have been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In an automatic slack adjuster for brakes, a plurality of brake rigging members having complementary threaded portions associated therewith, a rotatable member associated with one of said threaded portions, an element associated with the rotatable member and having a normal position and being axially movable relative to said rotatable member away from said normal position on movement of a brake rigging member beyond a predetermined point, means yieldingly opposing axial movement of said element from said normal position and operative to return said element to the normal position on movement of the brake rigging member from said predetermined point, and means operative on the return movement of said element to effect rotation of the rotatable member, and thereby effect relative rotation of the said threaded portions.

2. In an automatic slack adjuster for brakes, in combination, a pair of brake rigging members having complementary threaded portions associated therewith, a rotatable member associated with one of said threaded portions, an element associated with said rotatable member and having a normal position and being movable therefrom axially and rotatably on movement of a brake rigging member beyond a predetermined point, resilient means yieldingly opposing movement of said element from the normal position and operative to return said element substantially to the normal position rotatively on axial movement of the element to a given position away from said normal position, said resilient means being operative to return said element to the normal position axially on movement of the brake rigging member from the predetermined point, and means operative on axial movement of said element from said given position to the normal position subsequent to rotative movement thereof by the resilient means to effect rotation of the rotatable member.

3. In a device of the class described, a pair of brake rigging members having complementary threaded members associated therewith, and means to effect relative rotation of said threaded members, said means comprising a rotatable member associated with one of said threaded members, an element associated with the rotatable member, said element having a normal position and being movable axially and rotatably therefrom, resilient means yieldingly opposing axial movement of said element, said element being movable axially from the normal position on movement of a brake rigging member beyond a predetermined point, means for effecting the rotation of said element on axial movement thereof to a given position away from the normal position, the resilient means being operative to return said element to the normal position on movement of the brake rigging member from the predetermined point, and means operative on the return axial movement of said element subsequent to rotative movement thereof to effect rotation of the rotatable member.

4. In a device of the class described, a pair of brake rigging members having complementary threaded members associated therewith, and means to effect relative rotation of said threaded members, said means comprising a rotatable element associated with one of said threaded members, an operating element associated with the rotatable element, one of said elements being movable rotatively and axially relative to the other of said elements, said elements having a normal position relative to each other, resilient means yieldingly opposing relative axial movement of said elements in one direction, one of said elements being axially movable from said normal position relative to the other of said elements on movement of a brake rigging member beyond a predetermined point, means for effecting rotation of one of said elements relative to the other of said elements on relative axial movement of said members to a given position away from the normal position, the resilient means being operative to effect relative axial movement of said elements to return the said elements to the normal position on movement of the brake rigging member away from the predetermined point, and means operative on return axial movement of said elements subsequent to relative rotative movement thereof to effect rotation of the rotatable element.

5. In a device of the class described, in combination, a plurality of brake rigging elements, one of said brake rigging elements having complementary threaded portions associated therewith, and means to effect relative rotation of said threaded portions, said means comprising a rotatable member operatively connected to one of said threaded portions, a member associated with the rotatable member and having a normal position and being axially and rotatably movable therefrom relative to the rotatable member, means for effecting axial movement of said member on movement of a brake rigging element beyond a predetermined point, resilient means yieldingly opposing axial movement of said member away from the normal position, means operative on axial movement of said member away from the normal position to a given position for rotating said member relative to the rotatable member a predetermined amount, the resilient means being operative on movement of the brake rigging element away from the predetermined point to return said member to the normal position, and means operative on the return movement of the said member subsequent to rotative movement thereof relative to the rotatable member to effect rotation of the rotatable member.

6. In a device of the class described, a pair of brake rigging members having complementary threaded portions associated therewith, and means to effect relative rotation of said threaded portions, said means comprising a rotatable member operatively connected to one of said threaded portions, an operating element associated with the rotatable member and movable axially and rotatably relative thereto, said element having a normal position, resilient means yieldingly opposing axial movement of said element from the normal position, means operative on movement of one of said brake rigging members to a predetermined point to move said element axially relative to the rotatable member, means operative on movement of said element from the normal position to a given position spaced therefrom to rotate said element relative to the said rotatable member, stop means associated with said element and adapted to limit rotation of the said element by said means, the resilient means being operative to return said element to the normal position on movement of the brake rigging member away from the predetermined point, the element cooperating with the stop means on return movement of the element to the normal position subsequent to rotative movement thereof relative to the rotatable member to effect rotation of the rotatable member.

7. In a device of the class described, a pair of brake rigging members having complementary threaded portions associated therewith, and means to effect relative rotation of said threaded portions, said means comprising a rotatable member operatively connected to one of said threaded portions, an operating element associated with the rotatable member and movable axially and rotatably relative thereto, said element having a normal position, resilient means yieldingly opposing axial movement of said element from the normal position, means operative on movement of one of said brake rigging members to a predetermined point to move said element axially relative to the rotatable member, resilient means yieldingly opposing rotation of the element in one direction and operative on movement of said element relative to said rotatable member to a given position to rotate said element relative to the rotatable member, stop means associated with said element and adapted to limit rotation of the said element by said resilient means, the first-named resilient means being operative to return said element to the normal position on movement of the brake rigging member away from the predetermined point, the element cooperating with the stop means on return movement of the element to the normal position subsequent to rotative movement thereof relative to the rotatable member to effect rotation of the rotatable member.

8. In a device of the class described, a pair of brake rigging members having complementary threaded portions associated therewith, means to effect relative rotation of said threaded portions to vary the effective length of one of said brake rigging members, said means comprising a rotatable member operatively connected to one of said threaded portions, an operating element associated with said rotatable member and movable axially and rotatably relative thereto, said element having a normal position, said element and the rotatable member having portions thereof operatively interengaged when the said element is in the normal position and disengaged when the element is moved axially to a given position spaced from the normal position, stop means associated with said element and operative when the element is in the normal position to prevent rotation of the said element by the rotatable member on movement of the rotatable member in a direction to increase the length of the brake rigging member, means yieldingly opposing axial movement of the said element to the given position, manually operable means for moving said element to the given position, and manually operable means for rotating the rotatable member.

9. In a device of the class described, in combination, a pair of brake rigging members having complementary threaded portions associated therewith, and means to effect relative rotation of the said threaded portions, said means comprising a rotatable member associated with one of said threaded portions, said rotatable member having teeth formed in the periphery thereof, an operating element having a normal position and having a portion thereof extending between the teeth on the rotatable member when the said element is in the normal position and being out of alignment with the said teeth when the said element is moved axially to a given position away from the normal position, said element being movable axially and rotatably relative to the rotatable member, means yieldingly opposing movement of said element, stop means associated with the element and operative to limit rotation thereof in one direction, means operative on movement of a brake rigging member to a predetermined point to move said element axially from the normal position to the given position, means operative on movement of the said element to the given position to effect rotation of the said element relative to the rotatable member an amount substantially equal to the distance between adjacent teeth on the rotatable member, the resilient means being operative to return the operating element to the normal position on movement of the brake rigging member away from the predetermined point, the operating element and the stop means cooperating on movement of the said element from the given position to the normal position to effect rotation of the said rotatable member.

10. In a fluid pressure brake equipment for a car, a brake cylinder having a piston associated therewith, a pair of brake levers, a member pivotally secured to each of said levers, one of said levers having a portion thereof pivotally secured to a portion of the car structure, the brake cylinder piston being pivotally connected to the other of said levers, each of said levers having a brake applying member connected thereto, each of said levers having stop means associated therewith and operative to prevent further movement of the said lever after a predetermined amount of movement of the said lever in a direction to apply the brakes, the equipment being constructed and arranged so as to permit the brake cylinder piston to continue to move subsequent to engagement of either of the said levers with the stop means a distance sufficient to effect movement of the other of the said levers to a position to apply the brakes controlled thereby.

11. In an automatic slack adjuster, a screw, a nut cooperating with said screw, a member movable axially of the said nut for rotating said nut on said screw, manually operable means for moving said member axially of said nut out of operative relation with said nut, and manually operable means for effecting rotation of said nut.

12. In an automatic slack adjuster, a screw, a nut cooperating with said screw and operative upon rotation to effect longitudinal movement of the screw, a helical grooved portion carried by said nut, a rotatable and axially movable member having an element adapted to engage the grooves of said portion, said member being yieldingly rotatable upon longitudinal movement of said member in one direction to permit movement of said element through a groove in said portion without rotating said nut, and means for preventing rotation of said member upon longitudinal movement in the opposite direction to effect rotation of said nut by the movement of said element through a groove in said grooved portion.

13. In an automatic slack adjuster, a screw, a nut cooperating with said screw and operative upon rotation to effect longitudinal movement of the screw, a helical grooved portion carried by said nut, a rotatable and axially movable member having an element adapted to engage the grooves of said portion, a spring for yieldingly resisting rotation of said member upon longitudinal movement of said member in one direction to permit movement of said element through a groove in said portion without rotating said nut, and a stop for preventing rotation of said member in one direction upon longitudinal movement of said member in the opposite direction, to thereby effect rotation of said nut by the movement of said element through a groove in said grooved portion.

14. In a device of the class described, in combination, a brake rigging member having a substantially predetermined release position relative to a portion of the car structure, a brake rigging member operative by the first-named member, said members having complementary threaded portions associated therewith and operatively connecting the said members together, and means to effect relative rotation of the said threaded portions whereby the effective length of the last-named brake rigging member may be adjustably varied, said means comprising a rotatable member associated with one of said threaded portions, an operating element carried by the threaded portion associated with the last-named brake rigging member, said element having a normal position relative to the rotatable member and having means associated therewith and adapted to engage the car structure on movement of the first-named brake rigging member a predetermined distance away from the release position, said element being moved from the normal position on further movement of the brake rigging member away from the release position, means yieldingly opposing movement of said element from the normal position and operative to return the element to the normal position on movement of the brake rigging element to the release position, means operative on movement of said element to the normal position to effect rotation of the rotatable member, whereby relative rotation of the threaded portions is effected and whereby the threaded portion associated with the last-named brake rigging member is moved relative to the first-named brake rigging member and relative to the car structure, and means operative on movement of the rotatable member to vary the position of the car structure engaging means associated with the operating element relative to the last-named brake rigging member in accordance with movement of the threaded portions relative to each other.

15. In an automatic slack adjuster for brakes, in combination, a plurality of brake rigging elements, a threaded member operatively connected to one of said elements, a casing operatively connected to the other of said brake rigging elements, a rotatable member associated with the casing and having threads formed thereon complementary to the threads on the threaded member, and means to effect rotation of the rotatable member, said means comprising an operating element carried by said casing and having a normal position relative to said rotatable member and being movable therefrom axially and rotatably, resilient means yieldingly opposing axial movement of said element from the normal position, means operative on movement of a brake rigging element to a predetermined position to move the operating element from the normal position, means operative on movement of the operating element to a given position spaced from the normal position to effect rotation of the operating element relative to the rotatable member, the resilient means being operative to return the operating element from the given position to the normal position on movement of the brake rigging element from the predetermined point, and means operative on the return movement of the said operating element from the given position to the normal position to effect rotation of the rotatable member relative to the threaded member.

16. In a vehicle brake equipment, in combination, a pair of brake levers, a member pivotally connected to each of said levers at a point intermediate the ends thereof, means pivotally connected to one of said levers at a point spaced from the point of connection of said member with said lever and operative to effect movement of the said levers relative to each other, each of said levers having a brake applying member connected thereto, each of said levers being adapted to engage and to have further movement thereof prevented by a stop associated with the car structure after a predetermined amount of movement of the lever from the release position toward the application position, each of said brake applying members having means interposed therein and automatically operative to reduce the length of the brake applying member on movement of the brake lever associated with the said brake applying member to a predetermined position.

17. In a vehicle fluid pressure brake equipment, in combination, a brake cylinder having a piston associated therewith, a pair of brake applying members operated by said piston, the connection between the brake cylinder piston and the brake applying members including equalizing means operative to permit either of said brake applying members to be moved by the brake cylinder piston toward the application position after further movement of the other of said brake applying members is prevented, each of said brake applying members having associated therewith stop means operative to prevent further movement of said member after predetermined movement thereof in a direction to apply the brakes, the equipment being constructed and arranged to permit the brake cylinder piston to continue to move subsequent to engagement of either of said brake applying members with its associated stop means a distance sufficient to effect movement of the other of said brake applying members to apply the brakes controlled thereby.

18. In a vehicle fluid pressure brake equipment, in combination, a brake cylinder having a piston associated therewith, a pair of brake applying members operated by said piston, the connection between the brake cylinder piston and the brake applying members including equalizing means operative to permit either of said brake applying members to be moved by the brake cylinder piston toward the application position after further movement of the other of said brake applying members is prevented, each of said brake applying members having associated therewith stop means operative to prevent further movement of said member after predetermined movement thereof in a direction to apply the brakes, the equipment being constructed and arranged to permit the brake cylinder piston to continue to move subsequent to engagement of either of said brake applying members with its associated stop means a distance sufficient to effect movement of the other of said brake applying members to apply the brakes controlled thereby, each of said brake applying members having means interposed therein for reducing the movement of said member necessary to effect an application of the brakes, said means being automatically operative in response to movement of said brake applying member in the direction to apply the brakes before further movement of said brake applying member is prevented by the stop means associated therewith.

BURTON S. AIKMAN.